May 30, 1961   K. C. JONES   2,986,263
RUG DRYING CONVEYOR MEANS
Filed Aug. 21, 1957   2 Sheets-Sheet 1

INVENTOR.
KENNETH C. JONES
BY *Frank R. Hill*
ATTORNEY

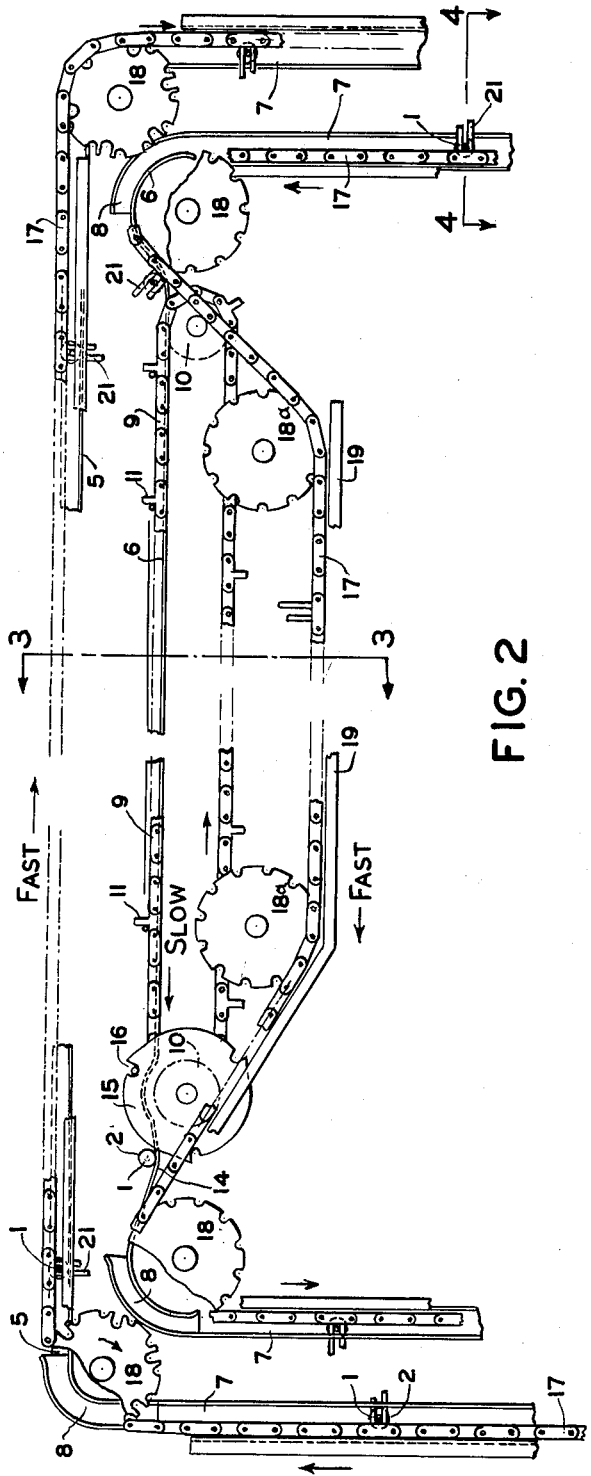

United States Patent Office 2,986,263
Patented May 30, 1961

2,986,263
RUG DRYING CONVEYOR MEANS
Kenneth C. Jones, 18928 Winslow Road,
Shaker Heights, Ohio
Filed Aug. 21, 1957, Ser. No. 679,442
5 Claims. (Cl. 198—34)

This invention relates to conveyor means for commercial employment in drying of rugs after cleaning thereof.

The invention contemplates a drying enclosure such as a building loft, and slow progress of rugs therealong, each suspended from a pole, in closely spaced parallel relation, individual loading of the rugs onto their poles at a station adjacent the inlet end of the enclosure, unloading of the rugs from their poles at a station adjacent the enclosure outlet end, and return of the empty poles to the loading station for their reloading, with stoppage of pole movement to permit loading.

For the purpose a set of end supported and propelled poles are provided, horizontally disposed in parallel spaced relation along conveyor means providing an endless path of travel, the conveyor including a slow section arranged within the drying enclosure adjacent its ceiling to progress the poles slowly therethrough in closely spaced relation, and a fast section arranged to progress the poles rapidly in widely spaced relation through the remainder of the path, speeds and spacing being so correlated that the poles travel their path in succession through both slow and fast sections thereof, without piling up at any location therealong as between sections, that a rug may be loaded on its pole at the loading station and elevated its suspended length therefrom before the next succeeding pole is there presented, and that drying may be completed before arrival at the unloading station.

Apparatus of the class thus far described is known in the art, and this invention constitutes improvements therein, as will appear.

An object of the invention is to provide complete control of each pole throughout the path of travel, with positive securement of the pole in perpendicular relation to the path, whether instantly progressing horizontally, vertically, or slopingly therealong, to thereby eliminate possibility of dropping, particularly at points of transfer between different moving parts as between sections of the conveyor.

Another object is to reduce the number of such points of transfer to two only, namely those between the slow and the fast conveyor sections.

Still another object is to improve the fast conveyor section by reduction of its parts, and simplified rigging thereof.

A further object is to arrange such rigging for improved cooperation with the conveyor slow section, particularly at points of pole transfer.

Further objects will be apparent from the following description taken in connection with the accompanying drawings, which are somewhat conventionalized and diagrammatic, wherein Fig. 1 is an elevation, viewed endwise of the poles, indicating an installation exemplifying the invention;

Fig. 2 is an enlarged view showing details of parts indicated in Fig. 1 at and adjacent the ends of the slow conveyor section, some parts being broken away to show details of others;

Figures 3, 4:
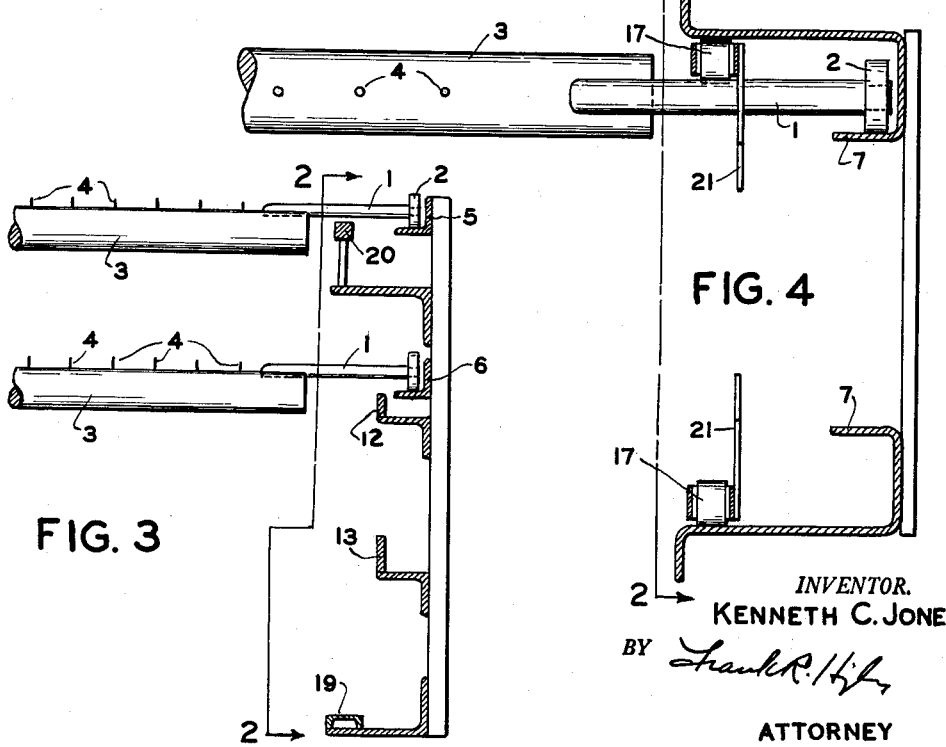
Fig. 3 is an enlarged view, as in sectional elevation in the plane of line 3—3 Fig. 2 showing track details adjacent pole ends on the conveyor means.
Fig. 4 is an enlarged view as in horizontal section in the plane of line 4—4 Fig. 2 showing details adjacent a pole end on a vertical stretch of the fast conveyor means.

In Figs. 3 and 4, lines 2—2 indicate the plane of Fig. 2.

Figure 1:
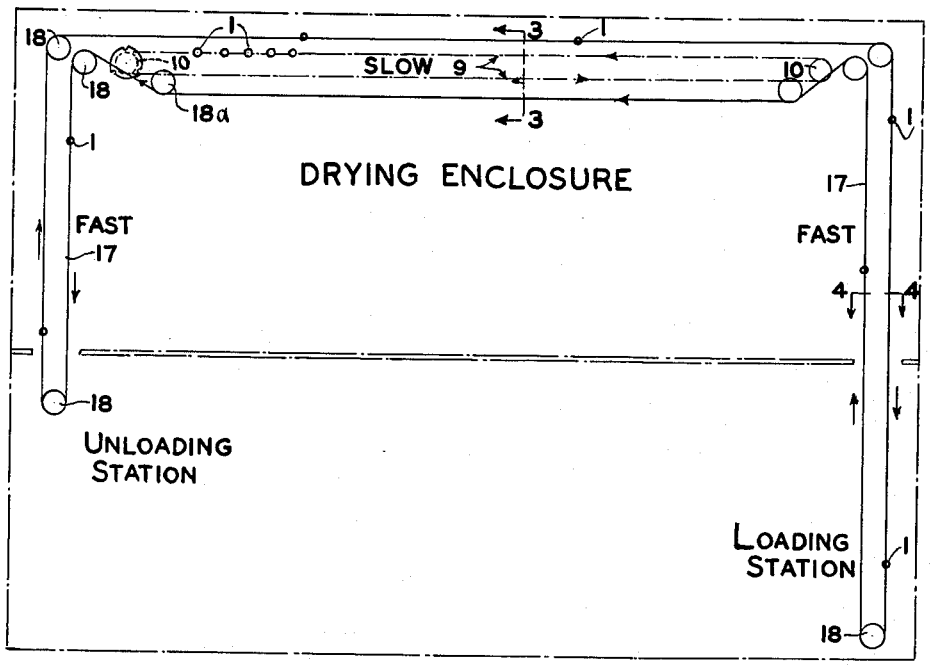

With reference now to the drawings, as indicated in Figs. 1 and 2 the invention includes a set of poles horizontally disposed in parallel spaced relation along an endless path of travel. As indicated in Figs. 3 and 4, each pole includes, at each end, a shaft 1 provided with a roller 2, and an enlarged intermediate portion 3 eccentric of its end shafts, and of length sufficient for rug widths to be accommodated, porvided with impaling pins 4 for securement of a rug thereon to be dependent therefrom.

For guidance, support and confinement of the poles along their path of travel, a track is provided, comprising a pair of parallel rail means each disposed for engagement by the rollers 2 at the corresponding pole ends.

As indicated in Fig. 1 the path thus defined includes a horizontal low speed or slow section located adjacent the ceiling of the drying enclosure. Also it includes a high speed or fast section leading, from a loading station adjacent an end of the enclosure and here shown therebelow, to one end of the slow section, thence from the other end of the slow section downwardly to an unloading station therebelow, and returning to the loading station.

As here indicated return is by way of a horizontal stretch just above the slow section within the enclosure, as preferable in most installations. However the return might be arranged instead to locate the horizontal stretch either above or below the floor of the drying enclosure.

The rail means for defining the pole path, include horizontal, vertical, and curved interconnecting stretches.

As best shown in Fig. 3, the horizontal rails may be in the form of angles, as at 5 and 6 along the fast and slow sections respectively, having flanges supporting the rollers 2.

As shown in Fig. 4, the vertical rails may be in the form of wide channels 7 each having a flange against which the rollers bear.

As shown in Fig. 2, the curved interconnecting stretches are in the form of narrow channels 8 for closely confining the rollers between their flanges through a 90° arc. Adjacent the loading and unloading stations, similar channels are provided, extending 180° as will be apparent.

For propulsion of the poles along the slow section of their path, upon the rails 6, a pair of endless chains 9 are provided, each rigged between a pair of sprockets 10, arranged to locate a stretch of the chain adjacent its rail 6 and a return stretch therebelow. Each chain is provided with closely spaced lugs 11 located to engage the shaft 1 of a pole upon its rail and thereby advance the poles along the rail in correspondingly spaced relation. The spacing may be in the order of 6" to 12", depending upon the installation conditions.

It will be apparent that the rails 6, with their chains 9 and lugs thereon constitute principal parts of low speed or slow conveyor section for poles in closely spaced relation therealong. As the capacity of this conveyor section may be sixty or more poles at a time, depending upon the installation, rails for support of the chain stretches may be provided, as at 12 and 13, Fig. 3, for upper and lower stretches respectively.

The rails 6 extend continuously beyond the chains 9 of the slow conveyor section.

At the receiving end they slope downwardly from the inner flange of the adjacent curved interconnecting rail stretch 8, as shown at the right, Fig. 2.

At the discharge end they are formed to provide a rise, then a depression or dip 14, and then slope upwardly to join the inner flange of the adjacent interconnecting rail stretch 8, as shown at the left, Fig. 2.

Preferably a slightly offset transfer disc 15 is arranged adjacent the discharge end at each rail 6 to turn concentrically with its near sprocket 10 and provided with notches 16 to insure transfer of poles from the chains over the rise and to the dip. The notches are formed to propel the poles perpendicularly along the track without raising their rollers therefrom; and are in such timed relation with the lugs 11 to take over pole propulsion therefrom without interference.

For propulsion of the poles along the fast section of their path, a pair of endless propeller chains 17 are provided, each rigged over a set of sprockets 18 which locate their chains in planes slightly offset from the slow chains 9 respectively.

Each of the curved stretches of the track is matched by a concentrically disposed sprocket 18 thereadjacent, and it will be apparent that the arrangement is such that the chains 17 are disposed along the path of pole travel defined by the track throughout the fast portion thereof.

However, for each chain 17 its sprocket 18 include a pair of idler sprockets 18a which train the chain below the level of, along and adjacent, the slow conveyor section. More particularly, the idler sprockets provide for the fast chains a downwardly sloping approach to the slow section and an upwardly sloping departure therefrom.

As shown in Fig. 3, supporting rails are provided along the horizontal stretches of the chains 17, thus rail 19 for the lower stretch and rail 20 for the upper stretch.

The chains 17 are of roller type as indicated in Fig. 4. For propelling engagement with the poles, each is provided, at widely spaced locations therealong, with pairs of fingers 21, each pair rigidly secured upon a link, spaced to receive a pole end in the notch therebetween.

In each such pair, the leading finger is sufficiently short to clear a pole positioned in the depression 14 at the discharge end of the slow conveyor, and the following finger is sufficiently long to engage such pole.

Thus a pole end positioned in the depression 14 will be engaged between the next passing pair of fingers 21, propelled by the longer finger of the pair along its rail past the adjacent curved stretch 8 thereof, and thence will move downwardly along the succeeding vertical rail stretch, supported on the shorter finger of the pair and secured in the corresponding notch.

As may appear from Fig. 4, in the vertical rail stretches, the bearing of a pole end upon its supporting finger will cause bearing of the pole roller upon its rail flange, and also bearing of the next adjacent lower roller of the fast chain upon its opposite flange; the chain rollers being of slightly greater diameter than the width of their links.

As appears from Fig. 2, in the upper horizontal stretch of the fast chain, the fingers 21 extend downwardly therefrom, the longer finger of the pair propelling the pole end along its rail 5, the shorter finger however preventing any overrunning of the pole end, so that pole perpendicularity is assured.

Adjacent the receiving end of the low speed conveyor, the pole end roller rests upon the rail 6 which is there downwardly sloping so that the pole end tends to run ahead of the fast chain, but is prevented therefrom by the shorter finger of the pair. As the fingers progress downwardly with the fast chain, below the slow conveyor, they withdraw from the pole end, leaving it in position on its track to be immediately engaged by the next succeeding lug 11 on the slow chain.

Figs. 1 and 2 show close pole spacing on the slow section and wide spacing on the fast section of the conveyor, but without attempt at scale or uniformity, it being understood that in practice the lugs 11 are uniformly spaced along their slow chains 9, as are the fingers 21 along their fast chains 17.

Also, it will be understood that the sets of lugs and fingers at opposite ends of the poles, are in alignment to maintain the poles extending perpendicularly between the rails.

Spacing along the fast chains, is at least as great as the length of the usual rug to be accommodated, for example, twenty feet, and twenty-four times that along the slow chains. Then the fast chain speed must be 24 times the slow chain speed, in order to prevent piling of poles at the points of transfer between fast and slow sections of the conveyor.

Drive of the high speed chains may be had preferably by way of the sprockets 18 adjacent the unloading station, with manual start subject to control of an operator at the loading station as after having there loaded a pole, and automatic stop as upon presentation of the next pole at the loading station, the rugs being automatically removed at the unloading station as known in the art.

Drive of the slow chains may be had preferably by way of their sprockets 10 adjacent the discharge end of the slow conveyor, and may be through suitable gearing with the high speed driving means, or independently as intermittent automatically responsive to delivery of a pole to the slow section of the conveyor, also as known.

From the foregoing, it will be apparent that the invention herein disclosed for exemplification meets the recited objects thereof.

What I claim is:

1. Rug drying apparatus of the class described and comprising, a set of end supported and propelled rug receiving poles horizontally disposed in parallel spaced relation along an endless path of travel, a slow drying conveyor section having receiving and discharge ends, and extending horizontally along an elevated portion of said path between said ends, and arranged to cause rug laden poles to progress slowly therebetween in closely spaced relation, and a fast conveyor section arranged to serve said slow section by cooperation therewith to form said endless pole path and adapted to cause movement of poles rapidly, in widely spaced relation along the remainder portion of said path, from and to said slow section, said fast conveyor section including a single pair of endless pole propeller chains arranged to provide pole advancement throughout said remainder path portion, to said receiving end of said slow section by way of a rug loading station, and from said discharge end thereof by way of a rug unloading station, and to pass adjacently beneath the poles on said slow section without propelling effect.

2. Apparatus as set forth in claim 1 wherein said propeller chains are arranged to have downwardly sloping movement adjacent said receiving end of said slow section, and upwardly sloping movement adjacent said discharge end thereof.

3. Apparatus as set forth in claim 1 wherein said slow conveyor section includes a pair of pole supporting rail means extending continuously therealong from a location adjacent its receiving end providing pole support before discontinuance of pole propelling effect of said fast conveyor section, to a location adjacent said discharge end before resumption of said pole propelling effect of said fast conveyor section.

4. Apparatus as set forth in claim 1 wherein said slow conveyor section includes a pair of pole supporting rail means extending continuously therealong from a location adjacent its receiving end providing pole support before discontinuance of pole propelling effect of said fast conveyor section, to a location adjacent said discharge end before resumption of said pole propelling effect of said fast conveyor section and said fast conveyor section is arranged to provide downwardly sloping pole deposit on said rail means and upwardly sloping pole departure from said rail means.

5. Apparatus as recited in claim 1 wherein said remainder path portion includes an empty pole stretch above said slow conveyor section and said chains are provided with pole propeller lugs disposed to extend downwardly along said empty pole stretch, and upwardly beneath said slow conveyor section.

References Cited in the file of this patent

UNITED STATES PATENTS

| | | |
|---|---|---|
| 2,335,790 | Ransburg | Nov. 30, 1943 |
| 2,769,728 | Juvinall | Nov. 6, 1956 |
| 2,783,868 | Myers | Mar. 5, 1957 |